(12) United States Patent
Rudoy et al.

(10) Patent No.: US 7,635,004 B2
(45) Date of Patent: Dec. 22, 2009

(54) NON-PYROTECHNIC ISOLATION VALVE ELEMENT

(76) Inventors: Edward Rudoy, 4625 Wolfe Way, Woodland Hills, CA (US) 91364; Edwin E. Vega, 8251 Calatrana Dr., Woodland Hills, CA (US) 91364

( * ) Notice: Subject to any disclaimer, the term of this patent is extended or adjusted under 35 U.S.C. 154(b) by 0 days.

(21) Appl. No.: 11/826,828

(22) Filed: Jul. 18, 2007

(65) Prior Publication Data

US 2008/0066804 A1 Mar. 20, 2008

Related U.S. Application Data

(60) Provisional application No. 60/831,447, filed on Jul. 18, 2006.

(51) Int. Cl.
*F16K 17/40* (2006.01)
(52) U.S. Cl. .............................. 137/70; 137/71; 251/66
(58) Field of Classification Search .................. 137/70, 137/71; 169/60, 61; 251/66, 67
See application file for complete search history.

(56) References Cited

U.S. PATENT DOCUMENTS

| | | | | |
|---|---|---|---|---|
| 2,620,815 A | * | 12/1952 | Margraf et al. ................. | 137/70 |
| 3,620,237 A | * | 11/1971 | Sindall et al. .................. | 137/70 |
| 3,722,596 A | * | 3/1973 | Livingston .................... | 169/60 |
| 3,759,282 A | * | 9/1973 | Kaldenback et al. .......... | 137/70 |
| 3,924,688 A | * | 12/1975 | Cooper et al. .................. | 169/61 |
| 5,471,888 A | * | 12/1995 | McCormick ................. | 137/76 |

* cited by examiner

*Primary Examiner*—John Rivell
(74) *Attorney, Agent, or Firm*—Hoffman, Wasson & Gitler

(57) ABSTRACT

A housing has a passageway containing a valve seat. A valve element seals against the valve seat to maintain the valve in the closed position. A release rod extends from the valve body and a shell surrounds the release rod, preventing its movement. The shell is formed in several sections, maintained together by a wire. The wire is connected to a frangible initiator which, upon failure, releases the wire from the shell, allowing these sections to move away from one another. When this occurs, the release rod and valve body are able to move, opening the valve, allowing fluid flow between the inlet and outlet of the valve.

6 Claims, 5 Drawing Sheets

NON-PYROTECHNIC ISOLATION VALVE ELEMENT

This application claims benefit of provisional application 60/831,447, filed Jul. 18, 2006

BACKGROUND OF THE INVENTION

Isolation valves are often actuated remotely to cause the isolation valve to move from the closed to open position. A common manner in which to actuate the isolation valve is through the use of pyrotechnics. However, use of pyrotechnics precludes the use of the isolation valve in many applications.

There is a need in the art for a remotely actuated isolation valve not utilizing pyrotechnics.

It is an object of the invention to provide an isolation valve having a frangible initiator to open the isolation valve.

It is another object of the invention to provide An isolation valve useable in a large number of environments.

These and other objects of the invention would become apparent to one of ordinary skill in the art after reading the disclosure of the invention.

SUMMARY OF THE INVENTION

A housing has a passageway containing a valve seat. A valve body seals against the valve seat to maintain the isolation valve in the closed position. A release rod extends from the valve body and a shell surrounds the release rod, preventing its movement. The shell is formed in several sections, maintained together by a wire. The wire is connected to a frangible initiator which, upon failure, releases the wire from the shell, allowing these sections to move away from one another. When this occurs, the release rod and valve body are able to move, opening the isolation valve, allowing fluid flow between the inlet and outlet of the isolation valve.

DETAILED DESCRIPTION OF THE INVENTION

Figure 1:
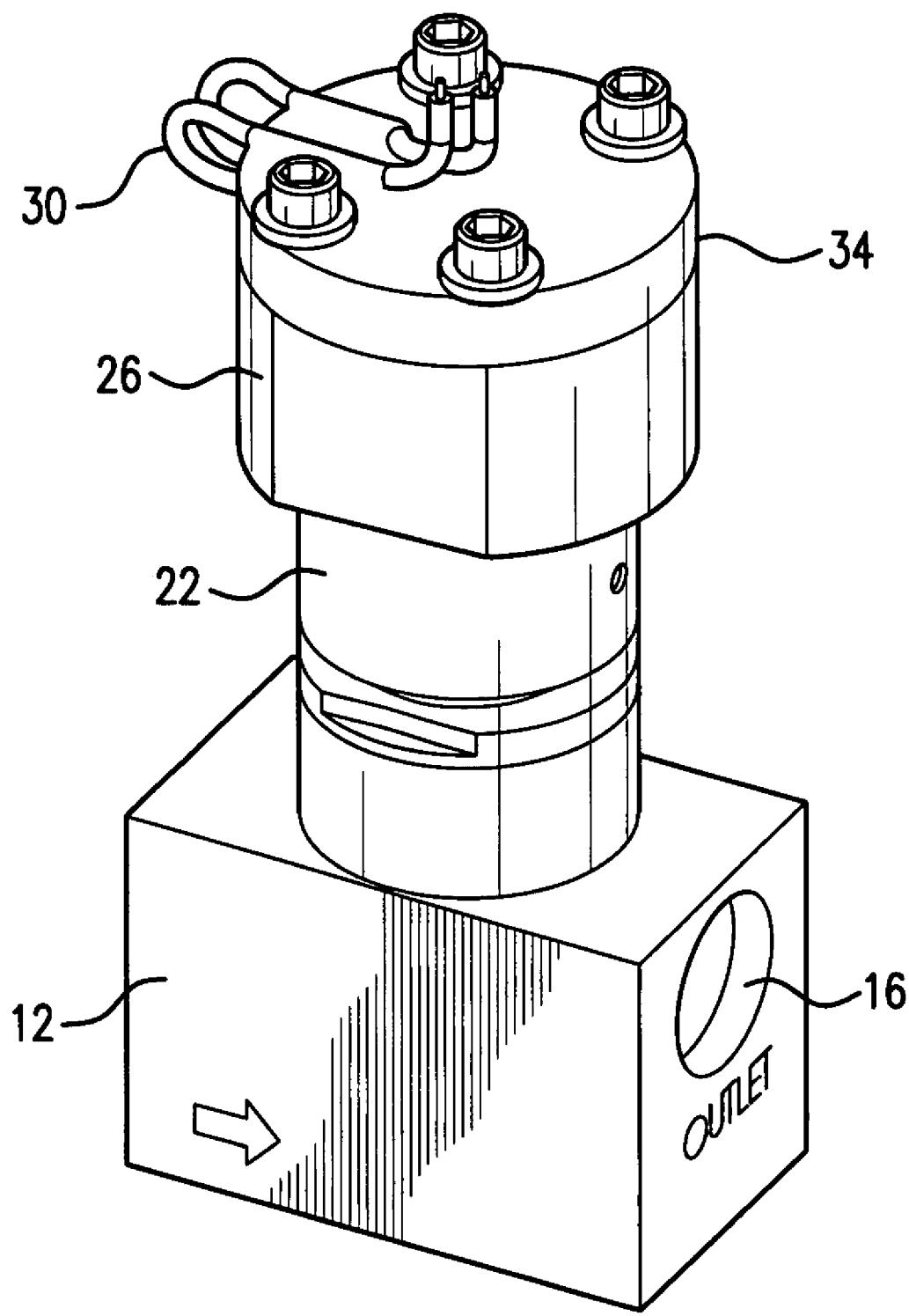
FIG. 1 is a perspective view of the valve.

FIG. 1 depicts the complete valve assembly with the high pressure supply manifold 12 forming the bottom of the assembly. The manifold has an inlet 14 (FIG. 2) and an outlet 16. A release rod guide 22 extends upwardly from the manifold 12 with a valve spool 26 attached to the rod guide. The top of the assembly is formed by a fuse wire assembly 30 and cover 34

Figure 2:
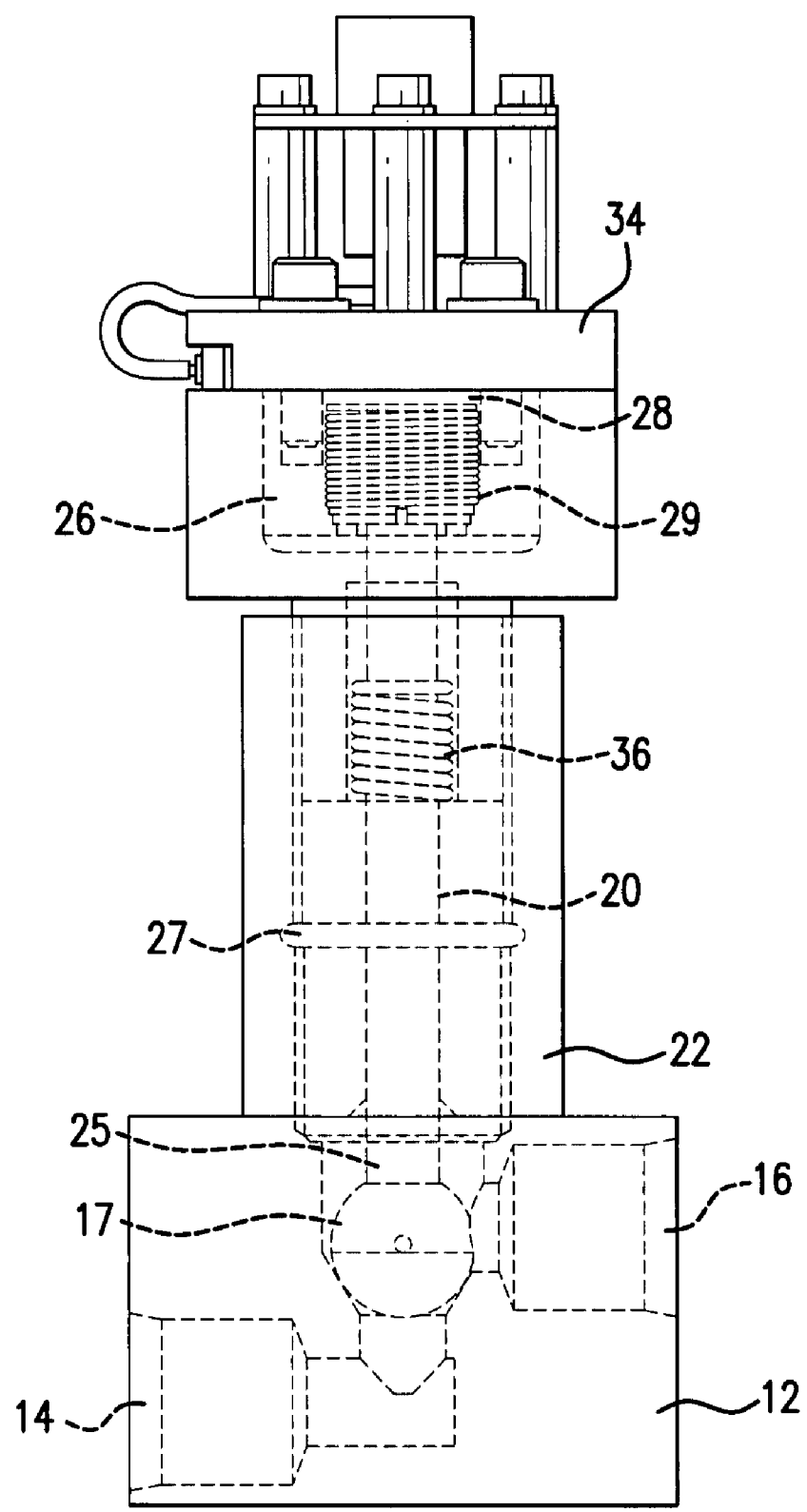
FIG. 2 is a cross-sectional view of a first embodiment of the valve.

In FIG. 2, the internal parts of the valve can be seen. The passage between the inlet and outlet extends though a vertical section. The vertical section ends in a tapered end 17 forming a seat for a valve body, such as a sealing ball 18, blocking fluid communication between the inlet 14 and outlet 16 when in the down position. A release rod extends from the sealing ball and has its upper end retained by a shell 28. A wire 29 surrounds the shell, as will be explained more fully later. The shell is housed within a valve spool 26 and attached to the fuse wire assembly 30. The shell prevents upward movement of the release rod.

Figure 3:
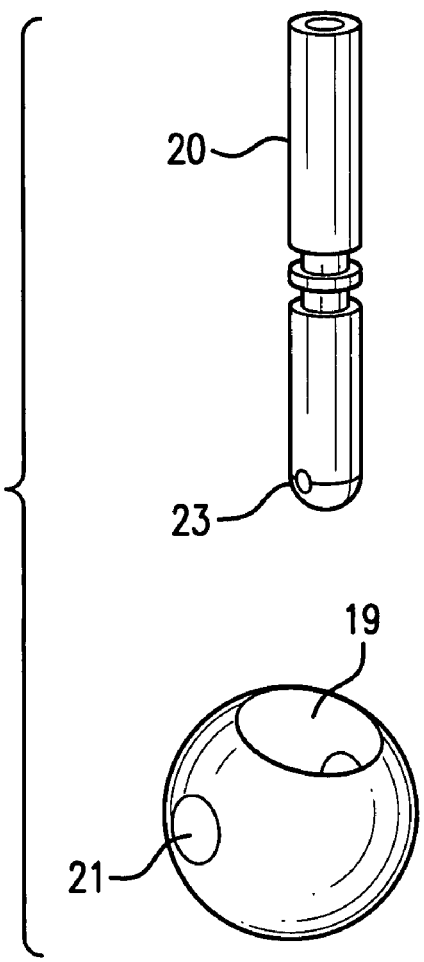
FIG. 3 is a perspective view of the valve body and release rod.

The sealing ball, seen in FIG. 3, has a recess 19 formed in the top ending in a tapered end. A passage 21 extends through the ball, passing through the recess 19. A release rod 20 having a semispherical end fits within the recess, lending a self aligning feature to the valve. The end of the release rod exerts a compressive force against the bottom of the recess 19. The release rod 20 has a lower section and an upper section. A guide pin fits tightly within the passage 21 of the sealing ball but loosely through a passage 23 formed in the release rod.

Figure 8:
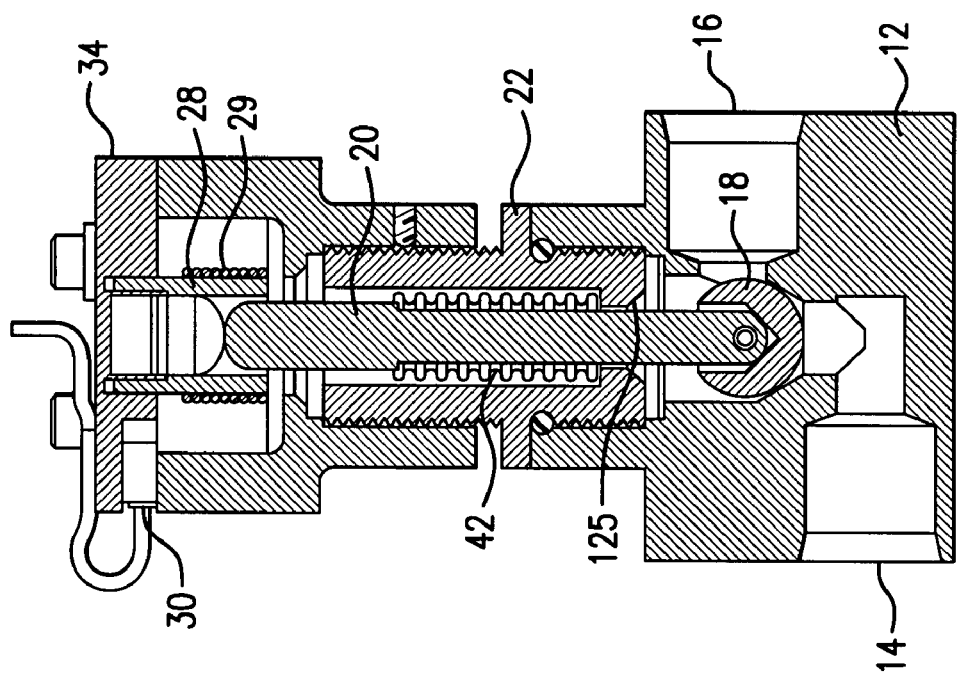
FIG. 8 is a cross-sectional view of the second embodiment in the opened position.

The release rod guide 22 has a central passage. The passage through the release rod guide 22 terminates in an outwardly flared ending 25 (FIG. 8), forming an upper seat for the sealing ball after its release. The release rod guide attaches to the manifold 12 by any conventional means such as a threaded connection. The release rod guide is formed with two flat faces to allow the application of torque by such means as a wrench. An O-ring 27 forms a seal between the release rod and release rod guide 22.

Figure 4:
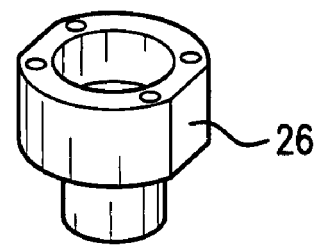
FIG. 4 is a perspective view of the valve spool.
Figure 5:
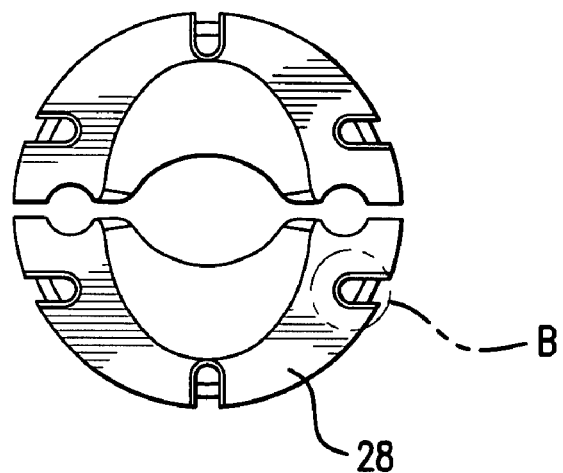
FIG. 5 is a top view of the shells.

An isolation valve spool 26, seen in FIG. 4, extends upwardly from the release rod guide and is connected by such means as a threaded connection and is sealed with a washer It also has two flat faces to allow the application of torque that is translated into lateral load in the seal between the ball and the seat in the valve body by such means as a wrench. The isolation valve spool houses the actuator shells 28. The top view of the shell is seen in FIG. 5. The shells surround and retain the release rod and is formed by at least two sections. The shell sections are held together by the wire 29.

Figure 6:
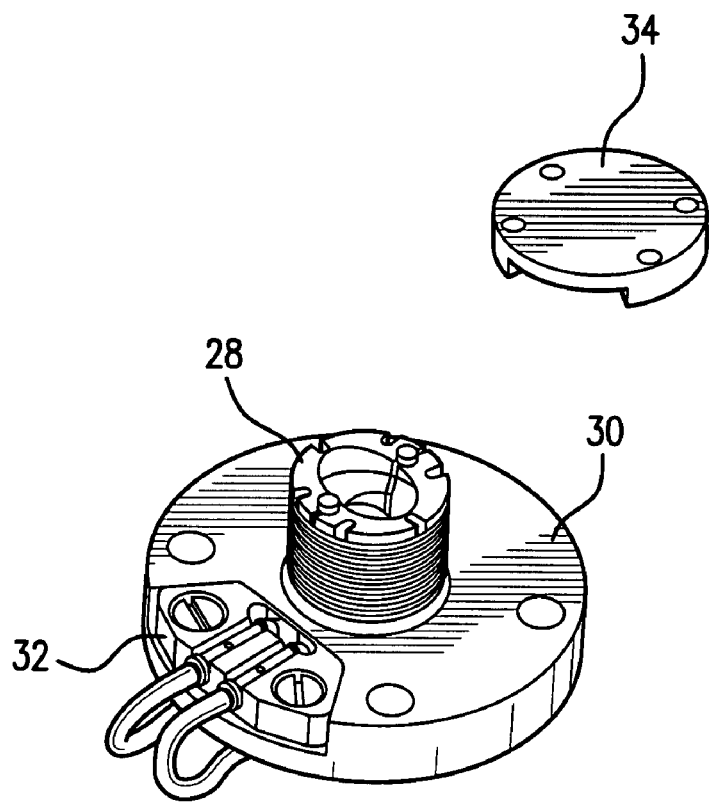
FIG. 6 is a perspective view of the fuse wire assembly.

In the preferred embodiment, the top of the valve assembly is formed by a fuse wire assembly 30 and cover 34, seen in FIG. 6. The fuse wire assembly retains the frangible initiator 32. Upon the application of electrical current to the fuse wire assembly, the fuse wire fails, causing the wire 29 to fall from the shell and allowing the shell sections to separate. The release rod can then be pushed upwardly by the fluid pressure. A biasing member, such as a spring 36, may be used to apply a light upward force to the release rod so that the valve body 18 will move upward after the actuator shells separate even in the absence of fluid pressure. The shell and fuse wire are only one of many possible initiation devices. Other initiation devices, such as pin-puller or other means of restricting and releasing can be used.

Figure 7:
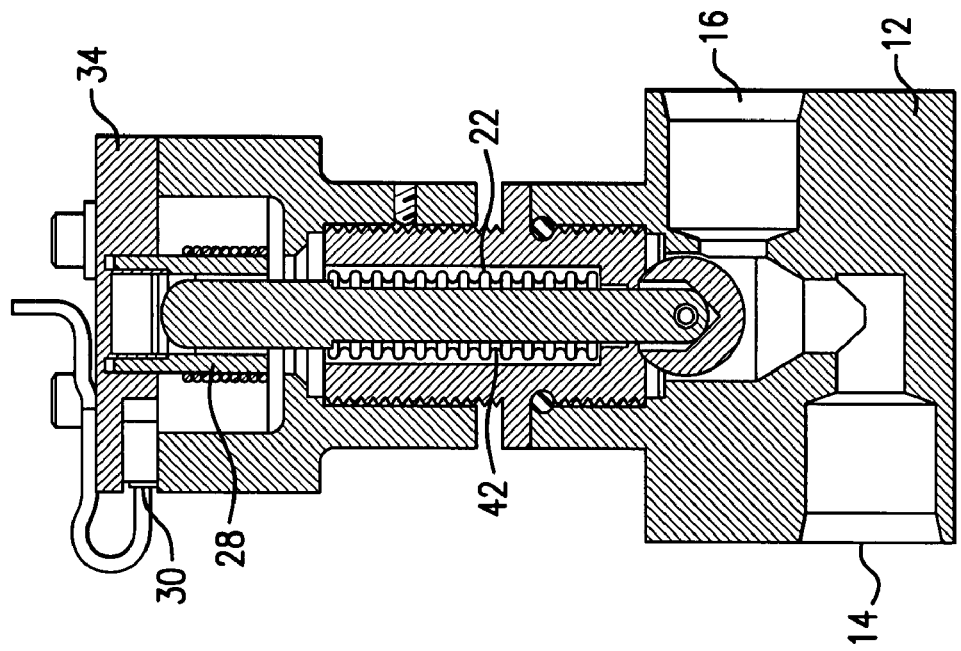
FIG. 7 is a cross-sectional view of a second embodiment of the valve in the closed position.

In place of the O-ring, the release rod can be sealed to the release rod guide by bellows 42. This arrangement is seen in FIG. 7 where the valve is closed and in FIG. 8 where the wire 29 is missing and the valve has opened. The top of the bellows are sealed to the rod 20 and the bottom sealed to the release rod guide 22. The seal of the bellows to the rod provides a fluid seal. When the rod is held down, with the sealing ball against the valve seal, the bellows are compressed. When the rod is released, the sealing ball moves upward and contacts a tapered surface 125 at the bottom of the release rod guide 22 to assist in preventing the upward flow of fluid. The bellows expand and help move the rod upwardly. The bellows act as a biasing member, applying a upward force so that a spring 36 also is not necessary, as well as a seal to replace the O-ring.

What is claimed is:
1. A valve comprising:
an inlet, an outlet and a passage extending between the inlet and outlet;

a valve seat formed in the passage;

a valve body sealing directly against the valve seat and preventing fluid from passing from the inlet to the outlet;

a release rod having a first end and a second end extending from said valve body at said first end; and a restrict and release mechanism having at least one restraining face adapted to abut against the second end of the release rod, wherein in a closed position the restraining face bears against and resists movement of the second end of the release rod away from the valve seat, and wherein in an open position the release rod is able to move away from the valve seat, the restrict and release mechanism being adapted to apply torque against the second end of the release rod, which is translated into lateral load seal in a seal between the valve body and the valve seat.

2. The valve of claim 1, further comprising a bellows placed about the release rod, wherein a top of the bellows is sealed to the release rod and a bottom of the bellows is sealed to a release rod guide.

3. The valve of claim 1, wherein the restrict and release mechanism comprises a shell at the top of the release rod, the shell having at least two sections and preventing movement of the release rod;

a wire about the shell, the wire keeping the at least two sections of the shell together; and a frangible initiator connected to the wire.

4. The valve of claim 3, wherein the frangible initiator allows the wire to break, causing the at least two sections of the shell to separate and allow movement of the release rod.

5. The valve of claim 3, further comprising a spring about the release rod to apply a light upward force to the release rod so that the valve body will move upward after the at least two sections separate even in the absence of a fluid pressure.

6. The valve of claim 1, wherein the valve body comprises a sphere.

* * * * *

UNITED STATES PATENT AND TRADEMARK OFFICE
CERTIFICATE OF CORRECTION

PATENT NO.         : 7,635,004 B2
APPLICATION NO.    : 11/826828
DATED              : December 22, 2009
INVENTOR(S)        : Edward Rudoy and Edwin E. Vega It is certified that error appears in the above-identified patent and that said Letters Patent is hereby corrected as shown below:

Col. 3, line 15; Claim 1 (line 18 - penultimate line): Delete "seal" (first occurrence), so that the phrase correctly reads as "lateral load in a seal between the valve body and the"

Signed and Sealed this

Eighth Day of June, 2010

David J. Kappos
*Director of the United States Patent and Trademark Office*